United States Patent
Sengupta et al.

(10) Patent No.: US 12,043,708 B2
(45) Date of Patent: *Jul. 23, 2024

(54) METHOD OF MAKING A HOMOGENEOUS MIXTURE OF POLYOLEFIN SOLIDS AND LIQUID ADDITIVE

(71) Applicant: Dow Global Technologies LLC, Midland, MI (US)

(72) Inventors: Saurav S. Sengupta, Gilbertsville, PA (US); Bharat I. Chaudhary, Princeton, NJ (US); Manish K. Mundra, Collegeville, PA (US); Abhijit Ghosh-Dastidar, East Brunswick, NJ (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/637,966

(22) PCT Filed: Aug. 26, 2020

(86) PCT No.: PCT/US2020/047929
§ 371 (c)(1),
(2) Date: Feb. 24, 2022

(87) PCT Pub. No.: WO2021/041497
PCT Pub. Date: Mar. 4, 2021

(65) Prior Publication Data
US 2022/0280903 A1    Sep. 8, 2022

Related U.S. Application Data

(60) Provisional application No. 62/893,258, filed on Aug. 29, 2019, provisional application No. 62/893,249, filed on Aug. 29, 2019.

(51) Int. Cl.
| | | |
|---|---|---|
| C08J 3/21 | (2006.01) |
| B01F 23/50 | (2022.01) |
| B01F 23/60 | (2022.01) |
| B29B 7/08 | (2006.01) |
| B29B 7/28 | (2006.01) |
| B29B 7/90 | (2006.01) |
| B29C 48/154 | (2019.01) |
| B29C 48/92 | (2019.01) |
| B29C 71/02 | (2006.01) |
| C08F 10/02 | (2006.01) |
| B01F 101/00 | (2022.01) |
| B29L 31/34 | (2006.01) |

(52) U.S. Cl.
CPC ............ *C08J 3/212* (2013.01); *B01F 23/511* (2022.01); *B01F 23/55* (2022.01); *B01F 23/60* (2022.01); *B29B 7/08* (2013.01); *B29B 7/286* (2013.01); *B29B 7/90* (2013.01); *B29C 48/154* (2019.02); *B29C 48/92* (2019.02); *C08F 10/02* (2013.01); *C08J 7/08* (2013.01); *B01F 2101/2805* (2022.01); *B29K 2023/06* (2013.01); *B29L 2031/3462* (2013.01); *C08J 2323/08* (2013.01)

(58) Field of Classification Search
None
See application file for complete search history.

(56) References Cited

U.S. PATENT DOCUMENTS

| | | |
|---|---|---|
| 3,646,155 A | 2/1972 | Scott |
| 4,117,195 A | 9/1978 | Swarbrick et al. |
| 5,112,919 A | 5/1992 | Furrer et al. |
| 6,830,777 B2 | 12/2004 | Danekas et al. |
| 7,188,993 B1 | 3/2007 | Howe et al. |
| 7,695,817 B2 | 4/2010 | Lin et al. |
| 8,124,309 B2 | 2/2012 | Lai et al. |
| 8,435,714 B2 | 5/2013 | Lai et al. |
| 8,680,177 B2 | 3/2014 | Starling |
| 8,697,787 B2 | 4/2014 | Chaudhary |
| 8,889,331 B2 | 11/2014 | Qiu et al. |
| 9,223,236 B2 | 12/2015 | Qiu et al. |
| 9,593,919 B2 | 3/2017 | Neff |
| 9,926,427 B2 | 3/2018 | Zhamu et al. |

(Continued)

FOREIGN PATENT DOCUMENTS

| | | |
|---|---|---|
| EP | 3385246 A1 | 10/2018 |
| GB | 2561172 A | 10/2018 |

(Continued)

OTHER PUBLICATIONS

Sanchez-Olivares, AIMS Materials Science, 2016, vol. 3, No. 2, p. 620-633.
Tarverdi, SPE ANTEC, Anaheim, 2017, p. 1058-1062.
Resodyn Mixing Application Bulletin, Blending Polyethylene Pellets with Carbon Black, 2018, pp. 1-2.
PCT/US2020/047932, International Search Report and Written Opinion with a mailing date of Nov. 25, 2020.

(Continued)

*Primary Examiner* — Yung-Sheng M Tsui

(57) ABSTRACT

A method of making a homogeneous mixture of polyolefin solids and liquid additive without melting the polyolefin solids during the making. The method comprises applying acoustic energy at a frequency of from 20 to 100 hertz to a heterogeneous mixture comprising the polyolefin solids and the liquid additive for a period of time sufficient to substantially intermix the polyolefin solids and the liquid additive together and while maintaining temperature of the heterogeneous mixture above the freezing point of the at least one liquid additive and below the melting temperature of the polyolefin solids, thereby making the homogeneous mixture without melting the polyolefin solids.

12 Claims, No Drawings

(56) References Cited

U.S. PATENT DOCUMENTS

| | | | |
|---|---|---|---|
| 9,957,360 B2 | 5/2018 | Hanan et al. | |
| 10,119,015 B2 | 11/2018 | Chaudhary et al. | |
| 2002/0042463 A1* | 4/2002 | Lundgard | C08G 18/0876 |
| | | | 524/487 |
| 2005/0148703 A1* | 7/2005 | Barone | C08L 89/04 |
| | | | 524/100 |
| 2010/0137481 A1* | 6/2010 | Shen | C08F 255/02 |
| | | | 524/110 |
| 2010/0152326 A1 | 6/2010 | Kurz | |
| 2011/0306698 A1* | 12/2011 | Pletcher | C08K 5/524 |
| | | | 524/110 |
| 2012/0098163 A1* | 4/2012 | vila-Orta | B29B 7/36 |
| | | | 264/444 |
| 2012/0130015 A1 | 5/2012 | Horn et al. | |
| 2012/0209056 A1 | 8/2012 | Kim | |
| 2013/0149453 A1* | 6/2013 | Romick | B32B 15/085 |
| | | | 524/504 |
| 2014/0018489 A1 | 1/2014 | Johnson | |
| 2014/0271321 A1 | 9/2014 | Maderud et al. | |
| 2015/0299494 A1 | 10/2015 | Sun et al. | |
| 2017/0121514 A1 | 5/2017 | Chaudhary et al. | |
| 2017/0253721 A1* | 9/2017 | Yoshida | B29B 7/86 |
| 2018/0272565 A1 | 9/2018 | Zhamu et al. | |

FOREIGN PATENT DOCUMENTS

| | | | | |
|---|---|---|---|---|
| KR | 20180079635 A | 7/2018 | | |
| WO | WO-2011111612 A1 * | 9/2011 | | B32B 23/00 |
| WO | 2018061989 A1 | 4/2018 | | |
| WO | WO-2019124233 A1 * | 6/2019 | | B01J 13/185 |

OTHER PUBLICATIONS

PCT/US2020/047929, International Search Report and Written Opinion with a mailing date of Nov. 19, 2020.

PCT/US2020/047929, International Preliminary Report on Patentability with a mailing date of Mar. 10, 2022.

* cited by examiner

METHOD OF MAKING A HOMOGENEOUS MIXTURE OF POLYOLEFIN SOLIDS AND LIQUID ADDITIVE

FIELD

Mixing polyolefins with additives.

INTRODUCTION

Patents and patent application publications in or about the field include U.S. Pat. Nos. 7,188,993 B1; 7,695,817 B2; 8,124,309 B2; 8,435,714 B2; 8,680,177 B2; 8,889,331 B2; 9,223,236 B2; 9,593,919 B2; 9,926,427 B2; 9,957,360 B2. Non-patent publications in or about the field include Assessment of extrusion-sonication process on *flame retardant polypropylene by rheological characterization*, by G. Sanchez-Olivares, et al. AIMS Materials Science, 2016; vol. 3, no. 2, pages 620 to 633; and ENHANCED DISPERSION OF PARTICLE ADDITIVE INTO POLYMERS USING TWIN SCREW EXTRUSION WITH ULTRASOUND ASSISTANCE, by K. Tarverdi, et al., SPE ANTEC Anaheim 2017, pages 1058 to 1062.

Prior mixing methods rely on mechanical blending of solids (e.g., in a stirred tank device) or melts (e.g., in a twin-screw extruder device) of polyolefins with liquid additives.

SUMMARY

We discovered a method of making a homogeneous mixture of polyolefin solids and liquid additive without melting the polyolefin solids during the making. The method comprises applying acoustic energy at a frequency of from 20 to 100 hertz to a heterogeneous mixture comprising the polyolefin solids and the liquid additive for a period of time sufficient to substantially intermix the polyolefin solids and the liquid additive together while maintaining temperature of the heterogeneous mixture above the freezing point of the at least one liquid additive and below the melting temperature of the polyolefin solids, thereby making the homogeneous mixture without melting the polyolefin solids.

DETAILED DESCRIPTION

A method of making a homogeneous mixture of polyolefin solids and liquid additive without melting the polyolefin solids during the making. The method comprises applying acoustic energy at a frequency of from 20 to 100 hertz (Hz) to a heterogeneous mixture comprising the polyolefin solids and the liquid additive for a period of time sufficient to substantially intermix (thoroughly or completely homogenize) the polyolefin solids and the liquid additive together while maintaining temperature of the heterogeneous mixture (and, optionally, maintaining temperature of the homogeneous mixture made therefrom) above the freezing point of the at least one liquid additive and below the melting temperature of the polyolefin solids, thereby making the homogeneous mixture without melting the polyolefin solids. The method may further comprise a feature without solidifying the liquid additive. The method may further comprise the limitation wherein the heterogeneous mixture is not mechanically agitated (not mixed by mechanical means) during the applying acoustic energy step.

Additional inventive aspects follow; some are numbered below for ease of reference.

Aspect 1. A method of making a homogeneous mixture of polyolefin solids and a liquid additive without melting the polyolefin solids during the making, the method comprising applying acoustic energy at a frequency of from 20 to 100 hertz (Hz) to a first heterogeneous mixture comprising at least one liquid additive and polyolefin solids for a period of time and at an acoustic intensity effective to substantially intermix the at least one liquid additive and the polyolefin solids together while maintaining temperature of the first heterogeneous mixture (and, optionally, maintaining temperature of the homogeneous mixture made therefrom) above the freezing point of the at least one liquid additive and below the melting temperature of the polyolefin solids, thereby making a first homogeneous mixture comprising the polyolefin solids and the at least one liquid additive without melting the polyolefin solids. The method may comprise without solidifying the at least one liquid additive. The method may further comprise the feature without mechanically moving the polyolefin solids or heterogeneous mixture during the applying step. Each of the at least one liquid additive independently has a freezing point less than 20.0° C., alternatively less than 15° C., alternatively less than 5° C. The freezing point of each of the at least one liquid additive independently may be at least −80° C., alternatively at least −50° C., alternatively at least −10° C. The polyolefin solids may have a melting temperature at which melting begins or starts that is 60° C. or higher, alternatively greater than 100° C., alternatively greater than 110° C. The polyolefin solids may have a melting temperature at which melting ends or completes of at most 220° C., alternatively at most 180° C., alternatively at most 150° C.

Aspect 2. The method of aspect 1 wherein the applying step is characterized by any one of features (i) to (v): (i) the frequency is from 50 to 70 Hz, alternatively from 55 to 65 Hz, alternatively from 58 to 62 Hz, alternatively from 59 to 61 Hz; (ii) the period of time is from 0.5 minute to 4 hours, alternatively from 0.5 minute to 2 hours, alternatively from 1 minute to 60 minutes; (iii) both (i) and (ii); (iv) the maintaining temperature of the first heterogeneous mixture below the melting temperature of the polyolefin solids comprises maintaining temperature of the first heterogeneous mixture at from 10° to 109° C., alternatively from 15° to 99° C., alternatively from 20.0° to 39.9° C., alternatively from 20.0° to 29.9° C. (e.g., 25° C.±3° C.); and (v) both (iv) and any one of (i) to (iii). The frequency is set by the acoustic mixer. The intensity is sufficient to move materials with sufficient amplitude that is effective for mixing.

Aspect 3. The method of aspect 1 or 2 wherein the polyolefin solids of the first heterogeneous mixture are characterized by a physical form (i.e., solid particulate form) that is a powder, granules, or pellets and by a melting temperature that is from 61° to 180° C., alternatively from 90° to 180° C., alternatively from 110° to 174° C., alternatively from 120° to 180° C.; and the at least one liquid additive of the first heterogeneous mixture is characterized by a freezing point of less than 20° C. or by a melting point from 20° to 99° C.; and the first heterogeneous mixture is maintained at a temperature greater than the freezing point or melting point of the at least one liquid additive and less than 110° C. during the applying step. The polyolefin solids of the first heterogeneous mixture may be characterized by an average particle size of from 10 to 500 particles per gram (ppg), alternatively from 11 to 80 ppg, alternatively from 20 to 40 ppg, as measured by counting.

Aspect 4. The method of any one of aspects 1 to 3 wherein the polyolefin of the polyolefin solids (i.e., particulate form of polyolefin polymer) is: (A) a polyethylene homopolymer;

an ethylene/alpha-olefin copolymer; a (hydrolyzable silyl group)-functional polyethylene copolymer (HSG-FP Copolymer); an ethylene/unsaturated carboxylic ester copolymer (e.g., ethylene/vinyl acetate (EVA) copolymer or ethylene/alkyl (meth)acrylate (EAA or EAM) copolymer); or a blend of any two or more thereof. The polyolefin may be the (hydrolyzable silyl group)-functional polyethylene copolymer (HSG-FP Copolymer)

Aspect 5. The method of any one of aspects 1 to 4, wherein the at least one liquid additive is any one or more of additives $(B)_{liq}$ to $(I)_{liq}$: $(B)_{liq}$ a liquid silanol condensation catalyst (dibutyltin dilaurate or ethanesulfonic acid); $(C)_{liq}$ a liquid antioxidant (e.g., 2-methyl-4,6-bis(octylthiomethyl)phenol e.g., IRGASTAB Cable KV 10); $(D)_{liq}$ a liquid colorant (e.g., a liquid dye); $(E)_{liq}$ a liquid scorch retardant; $(F)_{liq}$ a liquid stabilizer for stabilizing the homogeneous mixture against effects of ultraviolet light (UV stabilizer), such as a liquid hindered amine light stabilizer (HALS); $(G)_{liq}$ a liquid processing aid (e.g., mineral oil); $(H)_{liq}$ a liquid flame retardant (e.g., a brominated polystyrene; a brominated rubber a poly(vinyl bromide), a poly(vinylidene bromide), a poly(brominated-alkyl acrylate), a poly(alkyl brominated-acrylate), or a brominated butadiene-styrene copolymer); and $(I)_{liq}$ a liquid polymer that is not (A) (e.g., a polydimethylsiloxane fluid). The $(B)_{liq}$ liquid silanol condensation catalyst may be dibutyltin dilaurate or a $(C_1$-$C_4)$alkanesulfonic acid. The $(E)_{liq}$ liquid scorch retardant may be 2,4-diphenyl-4-methyl-1-pentene (also known as alpha-methyl styrene dimer or AMSD) or a liquid hydrolyzable silane (e.g., octyltriethoxysilane (OTES) or vinyltrimethoxysilane (VTMS)). The $(E)_{liq}$ may be a compound of formula $RSi(X)_3$, wherein R is $(C_1$-$C_{10})$alkyl, $(C_2$-$C_{10})$alkenyl, $(C_2$-$C_{10})$alkynyl, or X, and each X independently is $(C_1$-$C_{10})$alkoxy, $(C_1$-$C_{10})$carboxy, $di((C_1$-$C_{10})$alkyl)amino, or $(C_1$-$C_{10})$oximo. Alternatively or additionally, the at least one liquid additive may be a liquid organic peroxide (e.g., tert-butyl peroxyacetate), a liquid crosslinking coagent (e.g., triallyl isocyanurate), or a liquid moisture generator agent (e.g., a hydroxyl-terminated polydimethylsiloxane fluid). The homogeneous mixture of aspect 5 is moisture-curable and may comprise from 15.00 to 99.99 weight percent (wt %) of the (A) HSG-FP Copolymer and the remainder is liquid additive, all based on total weight of the homogeneous mixture. In aspect 5 the polyolefin of the polyolefin solids may be (A) a (hydrolyzable silyl group)-functional polyethylene copolymer (HSG-FP Copolymer)

Aspect 6. The method of any one of aspects 1 to 5 wherein the first heterogeneous mixture further comprises at least one particulate solid additive that is different than the polyolefin solids and the first homogeneous mixture further comprises the at least one particulate solid additive. The at least one particulate solid additive may be any one of solid additives $(B)_{sol}$ to $(I)_{sol}$: $(B)_{sol}$ a solid silanol condensation catalyst (e.g., toluenesulfonic acid); $(C)_{sol}$ a solid antioxidant (e.g., 2,2'-thiobis(6-t-butyl-4-methylphenol) sold as LOW-INOX TBP-6); $(D)_{sol}$ a solid colorant (e.g., carbon black or TiO2); $(E)_{sol}$ a solid scorch retardant (e.g., a hydroquinone); $(F)_{sol}$ a solid stabilizer for stabilizing the homogeneous mixture against effects of ultraviolet light (UV stabilizer), such as a solid hindered amine light stabilizer (HALS) (e.g., poly[[6-(1,1,3,3-tetramethylbutylbutyl)amino]-1,3,5-triazine-2,4-diyl][2,2,6,6-tetramethyl-4-piperidinyl)imino]-1,6 hexanediyl[(2,2,6,6-tetramethyl-4-piperidinyl)imino]]) sold as Chimassorb 944); $(G)_{sol}$ a solid processing aid (e.g., N,N'-ethylene bis(stearamide) solid as Kernamide W-40); $(H)_{sol}$ a solid flame retardant (e.g., a metal hydrate); and $(I)_{sol}$ a solid polymer that is not (A) (e.g., a polypropylene homopolymer or a propylene/ethylene copolymer). Alternatively or additionally, the at least one particulate solid additive may be a solid organic peroxide (e.g., dicumyl peroxide), a solid crosslinking coagent (e.g., triallyl isocyanurate), or a solid moisture generator agent (e.g., alumina trihydrate ($Al_2O_3 \cdot 3H_2O$) or calcium oxalate monohydrate). Each of the at least one particulate solid additive may have a melting temperature at which melting begins or starts that is greater than 20.0° C., alternatively greater than 100° C., alternatively greater than 200° C. The at least one particulate solid additive may have a melting temperature at which melting ends or completes of at most 4,000° C., alternatively at most 2,000° C., alternatively at most 1,000° C.

Aspect 7. The method of any one of aspects 1 to 6 further comprising, before the applying step, making the first heterogeneous mixture by contacting step (i) or (ii): (i) contacting the polyolefin solids with the at least one liquid additive to make the first heterogeneous mixture; or (ii) contacting the polyolefin solids with a lower-melting solid additive having a melting point from 25° to 110° C. (e.g., triallyl cyanurate, m.p. 26° to 28° C.) to make a heterogeneous solids pre-mixture, and melting the lower-melting solid additive without melting the polyolefin solids so as to make the first heterogeneous mixture. The lower-melting solid additive may have a melting point from 30.0° to 109° C., alternatively from 40.0° to 79.9° C., alternatively from 30.0° to 49.9° C. The polyolefin solids used in the contacting step (i) may be free of the at least one liquid additive. The first heterogeneous mixture used in the step of applying acoustic energy may be freshly prepared. The "freshly prepared" means that the time between the contacting step (i) or (ii) and start of the applying acoustic energy step may be sufficiently short so as to prevent the at least one liquid additive from having the length of time necessary for passively soaking or imbibing, if possible, into the polyolefin solids to any significant extent or to any extent. The sufficiently short time between the contacting step and start of the applying acoustic energy step may be less than 30 minutes, alternatively less than 15 minutes, alternatively less than 10 minutes, alternatively less than 5 minutes. Alternatively, the first heterogeneous mixture used in the step of applying acoustic energy may be pre-aged. The "pre-aged" means that the time between the contacting step (i) or (ii) and start of the applying acoustic energy step may be sufficiently long so as to allow the at least one liquid additive to have a length of time necessary for passively soaking or imbibing, if possible, some, but not all, of the at least one liquid additive into the polyolefin solids to a significant extent or measurable. The sufficiently long time between the contacting step and start of the applying acoustic energy step may be at least 30 minutes, alternatively greater than 60 minutes, alternatively greater than 120 minutes.

Aspect 8. The method of any one of aspects 1 to 7 further comprising a step of contacting the first homogeneous mixture with at least one particulate solid additive that is different than the polyolefin solids to make a second heterogeneous mixture comprising the first homogeneous mixture and the at least one particulate solid additive; and then applying acoustic energy at a frequency of from 20 to 100 Hz and at an acoustic intensity effective to substantially intermix the same together while maintaining temperature of the second heterogeneous mixture above the freezing point of the at least one liquid additive and below the melting temperature of the polyolefin solids, thereby making a second homogeneous mixture comprising the polyolefin solids, the at least one liquid additive, and the at least one particulate solid additive, without melting the polyolefin polymer solids during the making steps. The method may comprise without solidifying the at least one liquid additive. The at least one particulate solid additive may be as described elsewhere herein.

Aspect 9. The method of any one of aspects 1 to 8 further comprising a step of melting the polyolefin solids of the homogeneous mixture to make a melt mixture; shaping the melt mixture to give a shaped melt mixture; and cooling the shaped melt mixture to give a shaped solid. The shaped solid may be useful as manufactured article. The shaping may comprise coating, extruding, or molding. The homogeneous mixture may be the first or second made homogeneous mixture, as the numbered aspect may be.

Aspect 10. The method of aspect 9 wherein the shaping step comprises extruding the melt mixture as a coating onto a conductive core (e.g., a wire, fiber optic, or both), and allowing the coating to solidify to make a coated conductor comprising the conductive core and a coating-shaped solid at least partially covering the conductive core. The method may further comprise curing (crosslinking) the coating-shaped solid so as to give a coated conductor comprising the conductive core and a coating-shaped cured product at least partially covering the conductive core. This aspect may be used to make a manufactured article comprising a power cable such as a low voltage power cable.

Aspect 11. The method of aspect 9 or 10 further comprising curing the polyolefin of the shaped solid to give a shaped cured product.

Aspect 12. The shaped cured product prepared by the method of aspect 11.

The method makes the homogeneous mixture in an acoustic mixer device, which is free of components that could interfere with or dampen the acoustic energy of the applying step. Acoustic mixer devices for various scale uses from lab bench to commercial manufacturing may be available commercially, including resonant acoustic mixers from Resodyn Acoustic Mixers, Butte, Montana, USA.

The making method makes the homogeneous mixture without melting the polyolefin solids. In a practical sense achieving the homogeneity may be recognized be visual inspection or by sampling of the mixture as it transitions from a heterogeneous to a homogeneous state, and measuring a property of the sample. For example, homogeneity is achieved when the sampling error of the measurement is negligible or identical compared to the total error of the measurement. All other things being equal, (i) the greater the acoustic energy, the shorter the period of time needed to achieve homogeneity, and vice versa; and (ii) the closer is the frequency to a resonating with the polymer solids, the shorter the period of time needed to achieve homogeneity, and vice versa.

The homogeneous mixture made by the method may be characterized as homogeneous in that the liquid additive is substantially uniformly adsorbed as a film on exterior surfaces, and any accessible interior surfaces, of the polyolefin solids. The "substantially uniformly adsorbed" means virtually all accessible surfaces of the polyolefin polymer solids have at least some liquid additive adsorbed thereon, although the amounts of adsorbed liquid additive may vary across the surfaces. Once adsorbed on a surface of the polyolefin solids, the liquid additive may remain thereon or at least some may soak or imbibe or migrate into the polyolefin solids so as to make soaked polyolefin solids containing under the surfaces at least some of the liquid additive. In embodiments wherein some or all of the liquid additive has been soaked or imbibed or migrated into the polyolefin solids, the surfaces of the polyolefin solids may appear to be semi-dry or dry (free of liquid additive), but the total weight of the liquid additive-soaked polyolefin solids will equal the weight of the heterogeneous mixture from which the homogeneous mixture was made.

The method enables making a homogeneous mixture comprising the polyolefin solids and the at least one liquid additive without using melt extrusion or melt compounding, which require melting the polyolefin solids. Thus, the thermal history of the homogeneous mixture made by the method is less harmful (e.g., less oxidative degradation and/or less scorch or premature crosslinking) than the thermal history of a comparative homogeneous mixture made by melt extrusion or melt compounding. For example, the homogeneous mixture made by the method may have improved cure properties (e.g., lower hot creep %), improved mechanical properties (e.g., higher tensile strength, greater elongation-at-break) before and/or after heat aging thereof.

Liquid means an amorphous state of matter intermediate between a gas and a solid and having a stable volume, but not a defined shape.

Melting means changing a material from a solid state of matter to a liquid state of matter. Typically, melting means the changing is complete such that the liquid state of matter contains no unmelted solid form of the material. The temperature of a material at which the material is to be characterized as a solid or a liquid is 20° C.

Polyolefin means any macromolecule comprising constituent units derived from polymerizing an olefin-functional monomer or copolymerizing at least two olefin-functional monomers, or a mixture of such macromolecules. The polyolefin may be amorphous (i.e., having a glass transition temperature but no melting point in differential scanning calorimetry (DSC)) or semi-crystalline (i.e., having a glass transition temperature and a melting point in DSC).

Examples of suitable polyolefins are ethylene-based polymers such as polyethylene homopolymers and ethylene-based copolymers; propylene-based polymers such as polypropylene homopolymers and propylene-based copolymers; halogenated polyolefins; grafted alkenyl-functional monocyclic organosiloxane-polyethylene copolymers; ethylene/alkenyl-functional monocyclic organosiloxane copolymers; and polystyrene polymers such as those given in US 2012/0209056 A1. Examples of halogenated polyolefins are poly(vinyl chloride) polymers (PVC), chlorinated poly(vinyl chloride) polymers (CPVC), chlorinated polyethylene polymers, chlorinated natural or synthetic rubber, chlorinated polystyrene, poly(vinyl bromide) polymers, brominated butadiene/styrene copolymers; brominated polystyrene polymers, brominated natural or synthetic rubbers, and copolymers of vinyl chloride and a copolymerizable ethylenically unsaturated monomer. Examples of the copolymerizable ethylenically unsaturated monomer are vinyl acetate, vinyl butyrate, vinyl benzoate, vinylidene chloride, an alkyl fumarate, an alkyl maleate, vinyl propionate, an alkyl acrylate, an alkyl methacrylate, methyl alpha-chloroacrylate, styrene, trichloroethylene, a vinyl ether, a vinyl ketone, 1-fluoro-2-chloroethylene, acrylonitrile, chloroacrylonitrile, allylidene diacetate, and chloroallylidene diacetate, and mixtures of any two or more thereof. See U.S. Pat. No. 10,119,015 B2 for details. The polyolefins may be thermoplastic elastomers or compatibilizers such as those given in U.S. Pat. No. 8,697,787 B2. The polyolefin that is a copolymer may be a bipolymer (made by polymerizing two different olefin monomers), a terpolymer (made by polymerizing three different olefin monomers), or a tetrapolymer (made by polymerizing four different olefin monomers). The polyolefin that is a copolymer may be a block copolymer or a random copolymer.

In some aspects the polyolefin is an ethylene-based polymer. Examples of suitable ethylene-based polymers are polyethylene homopolymers, ethylene/($C_4$-$C_{20}$)alpha-olefin copolymers, ethylene/propylene copolymers, ethylene/propylene/diene monomer (EPDM) copolymers such as an ethylene/propylene/1,3-butadiene terpolymer, and ethylene/1-butene/styrene copolymers. Examples of suitable ethylene/($C_4$-$C_{20}$)alpha-olefin copolymers are ethylene/1-butene copolymers, ethylene/1-hexene copolymers, and ethylene/1-octene copolymers. The ethylene-based polymers may be an ultra-low-density polyethylene (ULDPE), very low-density polyethylene (VLDPE), a linear low-density polyethylene (LLDPE), a low-density polyethylene (LDPE), a medium-density polyethylene (MDPE), a high-density polyethylene (HDPE), or an ultra-high-density polyethylene (UHDPE). Many of the ethylene-based polymers are sold by The Dow Chemical Company under trade names like AFFINITY, ATTANE, DOWLEX, ENGAGE, FLEXOMER, or INFUSE. Other ethylene-based polymers are sold by other suppliers under trade names like TAFMER, EXCEED, and EXACT.

A monomer-based polymer such as an "ethylene-based polymer" or a "propylene-based polymer" means a macromolecule comprising from 51 to 100 weight percent (wt %) of constituent units derived from the monomer (e.g., the ethylene or propylene) and from 0 to 49 wt % of constituent units derived from one or more comonomers that are different than the monomer.

An olefin-functional monomer means an organic molecule containing at least one polymerizable carbon-carbon double bond, wherein the organic molecule is composed of carbon atoms, hydrogen atoms, optionally at least one halogen atom, and optionally at least one heteroatom selected from N, O, S, Si, or P. Typically the at least one heteroatom includes an oxygen atom and/or a silicon atom. Examples of olefin-functional monomers are ethylene, propylene, a ($C_4$-$C_{20}$)alpha-olefin, 1,3-butadiene, a norbornene, 5-ethylidene-2-norbornene, vinyl fluoride, vinyl chloride, vinyl bromide, vinyl iodide, vinyl acetate, a ($C_1$-$C_6$)alkyl acrylate, a ($C_1$-$C_6$)alkyl methacrylate, a vinyltrialkoxysilane such as vinyltrimethoxysilane of formula $H_2C=C(H)Si(OCH_3)_3$, or an alkenyl-functional monocyclic organosiloxane such as 2,4,6-trimethyl-2,4,6-trivinyl-cyclotrisiloxane, "($D^{Vi}$)$_3$" (CAS No. 3901-77-7) or 2,4,6,8-tetramethyl-2,4,6,8-tetravinyl-cyclotetrasiloxane, "($D^{Vi}$)$_4$" (CAS No. 2554-06-5).

Solid means a state of matter having a stable volume and defined shape. May be amorphous, crystalline, or semicrystalline.

Solidifying means changing a material from a liquid state of matter to a solid state of matter. Typically, solidifying means the changing is complete such that the solid state of matter contains no unsolidified form of the material.

Without being bound by theory, it is believed that the applying acoustic energy at the frequency of from 20 to 100 Hz generates sound waves that cause the polyolefin solids to oscillate rapidly. They experience a relatively large physical displacement, the magnitude and rapidity of which are believed to be a function of the frequency and acoustic intensity. This oscillating of the polyolefin solids results in their rapid intermixing with the at least one liquid additive to form the first homogeneous mixture. The first homogeneous mixture is thus made without solidifying the at least one liquid additive and, optionally, without mechanical mixing of polyolefin solids and the at least one liquid additive and without solidifying the at least one liquid additive or melting the polyolefin solids. The present method is distinct from prior mixing methods, which rely on mechanical blending of solids (e.g., in a stirred tank device) or melts (e.g., in a twin-screw extruder device) of polyolefins with liquid additives.

Sound having a frequency less than 20 Hertz (Hz) is called "infrasound"; and from 20 Hz to 20 kilohertz (KHz), "acoustic"; and greater than 20 KHz (up to 200 megahertz (MHz) or higher), "ultrasound". Without being bound by theory it is believed that infrasound and ultrasound and acoustic sound above 100 Hz cannot, by itself, rapidly oscillate the polyolefin solids in the heterogeneous mixture in a way that would create the relatively large physical displacement thereof and thereby yield the homogeneous mixture. The applying acoustic energy at a frequency of from 20 to 100 Hz is called "acoustic mixing" herein.

The method may further comprise a feature without mechanically moving the polyolefin solids or heterogeneous mixture during the applying step. Mechanically moving means putting in motion by applying, whether manually or via a machine, a direct contact force wherein a physical object (e.g., a stirrer paddle, a screw, a plunger, or a blender) touches and thereby moves a material. Examples of mechanically moving are stirring, screw mixing, plunger mixing, blender mixing, and other direct physically contacting. The contact force does not include electromagnetic force, gravity, acoustic force, and convective force.

The method may further comprise a feature substantially without or completely without soaking (or imbibing) the liquid additive into the polyolefin solids during the applying step. Soaking requires miscibility of the liquid additive in the polyolefin solids and effective soaking conditions. Such soaking conditions comprise a sufficient period of time (e.g., 8 to 16 hours) and a sufficient temperature from ambient temperature (e.g., 20° C.) to an elevated temperature (e.g., from 60° to 90° C.) to allow migration of the liquid additive into the polyolefin solids.

The expression "the heterogeneous mixture" may refer to the first or second heterogeneous mixture of the numbered aspects or claims or to the heterogeneous mixture of unnumbered aspects, as the case may be.

The heterogeneous mixture. May be made by contacting neat polyolefin solids that are free of the liquid additive with the liquid additive without homogenizing same. Alternatively, may be made by contacting a homogeneous mixture, made by inventive acoustic mixing or comparative melt-mixing, with a second liquid additive and/or a particulate solid additive without homogenizing same. Alternatively, may be made by dehomogenizing a homogeneous mixture of the polyolefin solids and liquid additive such as by allowing the homogeneous mixture to stand at 25° C. for a period of time sufficient to result in a coalescing of some of the liquid additive in, or migration of the liquid additive to surfaces of, the polyolefin solids. Alternatively, may be made by heating a heterogeneous mixture of the polyolefin solids and the lower-melting solid additive having a melting temperature lower than the melting temperature of the polyolefin solids, the heating being to a temperature greater than the melting temperature of the lower-melting solid additive but less than the melting temperature of the polyolefin solids and for a period of time sufficient to melt at least some, alternatively all of the lower-melting solid additive.

The heterogeneous mixture may have never before been homogenized or may have been dehomogenized as described above. Either way, the heterogeneous mixture is a non-uniform, physical combination of matter, e.g., consisting of unblended or partially (incompletely) blended constituents. The homogenization of the dehomogenized mixture may reconstitute its predecessor homogeneous mixture without remelting the polyolefin.

The polyolefin solids. A finely-divided, solid-state matter (i.e., solid particulates) form of polymer macromolecules that independently comprise at least 5, alternatively from 10 to 200,000 constituent units derived from polymerizing one or more olefin-functional monomers. Examples of the olefin-functional monomers are ethylene, alpha-olefins, dienes, unsaturated carboxylic esters, and olefin-functional hydrolyzable silanes. The polyolefin of the polyolefin solids may be an ethylene-based polymer comprising from 51 to 100 wt % of ethylenic units derived from polymerizing ethylene and from 49 to 0 wt % of comonomeric units derived from polymerizing one, alternatively two olefin-functional monomer (comonomer) selected from propylene; a ($C_4$-$C_8$)alpha-olefin such as 1-butene, 1-hexene, or 1-octene; an unsaturated carboxylic ester, and an olefin-functional hydrolyzable silane. Alternatively, the polyolefin of the polyolefin solids may be a propylene-based polymer comprising from 51 to 100 wt % of propylenic units derived from polymerizing propylene and from 49 to 0 wt % of comonomeric units derived from polymerizing one, alternatively two olefin-functional monomer (comonomer) selected from ethylene; a ($C_4$-$C_8$)alpha-olefin such as 1-butene, 1-hexene, or 1-octene; an unsaturated carboxylic ester, and an olefin-functional hydrolyzable silane. Examples of the alpha-olefins are propylene; a ($C_4$-$C_8$)alpha-olefin such as 1-butene, 1-hexene, or 1-octene; and a ($C_{10}$-$C_{20}$)alpha-olefin. Example of the diene is 1,3-butadiene. Examples of the unsaturated carboxylic esters are alkyl acrylates, alkyl methacrylates, and vinyl carboxylates (e.g., vinyl acetate). Examples of the olefin-functional hydrolyzable silanes are vinyltrialkoxysilanes, vinyltris(dialkylamino)silanes, and vinyl(trioximo)silanes. Examples of the polyolefin of the polyolefin solids are polyethylene homopolymers, polypropylene homopolymers, ethylene/propylene copolymers, ethylene/($C_4$-$C_8$)alpha-olefin copolymers, ethylene/propylene/1,3-butadiene copolymers, ethylene/unsaturated carboxylic ester copolymers, and ethylene/vinyl-functional hydrolyzable silane copolymers.

The polyolefin polymer solids may be porous or non-porous. The polyolefin polymer solids may comprise a powder, granules, or pellets.

The liquid additive. A neat liquid or a solution of a liquid or solid additive (solute) dissolved in a liquid solvent. The neat liquid is composed of molecules that are not polyolefin polymer macromolecules and have a temperature characteristic (i) or (ii): (i) a freezing point of less than 0° C., alternatively from 0° to 20.0° C.; or (ii) a melting point from 20.1° to 99° C., alternatively from 30.0° to 79.9° C., alternatively from 40.0° to 69.9° C. The liquid additive solute in the solution may be the same compound as described for the neat liquid. The solid additive solute in the solution may be a compound having a solubility of at least 1 wt % in the liquid solvent. The liquid solvent may be an organic liquid chosen for having a boiling point above the temperature of the heterogeneous mixture during the applying step. Suitable liquid solvents are hydrocarbons (e.g., mineral oil or xylenes), ethers (e.g., dibutyl ether), and blends of two or more thereof. In some aspects the liquid additive is added to the polyolefin solids as a neat liquid and the heterogeneous mixture is free of any liquid solvent.

The term "liquid additive" is used to describe the state of matter of the additive at the temperature of the heterogeneous mixture during the applying acoustic energy step, and does not necessarily require that the additive be a liquid at ambient temperature (e.g., 23° C.) if the temperature of the heterogeneous mixture during the applying step is greater than ambient temperature. In some aspects the liquid additive is a liquid at ambient temperature (e.g., at 23° C.).

The liquid additive may or may not impart to the homogeneous mixture and/or to the polyolefin solids thereof at least one beneficial functional property. For example, the liquid additive may merely be a filler material used only to lower the cost of a product made from the homogeneous mixture relative to the cost of a product made from the polyolefin solids without the liquid additive, but without providing a functional benefit thereto. Alternatively, the liquid additive may impart to the homogeneous mixture and/or to the polyolefin solids thereof at least one functional property such as color, increased stability (e.g., to degrading, embrittling, sagging, or dielectric losing effects from exposure to heat, ultraviolet light, electricity, and/or water), a source of crosslinking (when the liquid additive is a crosslinking coagent or a catalyst for enhancing crosslinking of the polyolefin), increased conductivity (e.g., electrical and/or thermal conductivity), and increased modulus.

Each heterogeneous mixture and homogeneous mixture independently may contain only one liquid additive, alternatively a combination of two or more different liquid additives.

The heterogeneous mixture, and thus the homogeneous mixture made therefrom by the method, may be free of (i.e., may lack) the particulate solid additive. In these embodiments the heterogeneous mixture, and thus the homogeneous mixture made therefrom by the method, may consist essentially of, alternatively consist of, the polyolefin solids and the at least one liquid additive.

Alternatively, the heterogeneous mixture, and thus the homogeneous mixture made therefrom by the method, may further comprise the particulate solid additive that is different than the polyolefin solids. In these embodiments the heterogeneous mixture and homogeneous mixture made therefrom by the method may consist essentially of, alternatively consist of, the polyolefin solids, at least one such liquid additive, and at least one such particulate solid additive.

The optional particulate solid additive. Substance that is not or does not contain a polyolefin polymer, i.e., is not any type of polymer or is a polymer wherein the constituent units are not derived from an olefin-functional monomer. The particulate solid additive may be characterized by a glass transition temperature, if any, and/or by a melting temperature greater than the melting temperature of the polyolefin solids, e.g., a melting temperature greater than 140° C., alternatively greater than 180° C. The actual glass transition temperature, if any, and melting temperature of the particulate solid additive is not important as long as it is/they are high enough that the particulate solid additive does not glass transition or melt during the applying step. The heterogeneous mixture and homogeneous mixture may comprise zero particulate solid additive, alternatively one particulate solid additive, alternatively a combination of two or more different particulate solid additives. The particulate solid additive may be inorganic or organic. Examples are carbon black, carbon nanotubes, diamond powder, graphite, graphene, powdered metals, powdered metal oxides, solid flame retardants, silica, alumina, and silicate glass beads. In some aspects the heterogeneous mixture, the method of making, and the homogeneous mixture made thereby is free of a particulate solid additive.

The polyolefin of the polyolefin solids may be the (A) HSG-FP Copolymer. The (A) HSG-FP Copolymer is made by copolymerizing monomers comprising ethylene and, optionally, olefin-functional comonomer(s) wherein at least one olefin-functional comonomer is the olefin-functional hydrolyzable silane. The composition of the (A) HSG-FP Copolymer may be characterized by constituent units selected from ethylenic units, alkylene-hydrolyzable silyl group units, optionally propylenic units, and optionally comonomeric units derived from the optional olefinic comonomer. Optionally, 0, 1, or more olefinic comonomer may be selected from a $(C_4-C_{20})$alpha-olefin, an olefinically-unsaturated carboxylic acid, an olefinically-unsaturated carboxylic ester, an olefinically-unsaturated carboxylic anhydride, and combinations thereof. The carboxylic acid may be monocarboxylic or dicarboxylic. The carboxylic ester may be monocarboxylic ester, dicarboxylic monoacid monoester, or dicarboxylic diester. The olefinically-unsaturated carboxylic acid may be a terminally unsaturated $(C_2-C_8)$carboxylic acid, alternatively a (meth)acrylic acid, alternatively an unsaturated dicarboxylic acid. The olefinically-unsaturated carboxylic ester may be a vinyl $(C_2-C_8)$ carboxylate ester, alternatively a vinyl $(C_2-C_5)$carboxylate ester (e.g., vinyl acetate, vinyl propionate, or vinyl butanoate), alternatively a $(C_1-C_8)$alkyl (meth)acrylate ester, alternatively a $(C_1-C_3)$alkyl (meth)acrylate ester, alternatively a di$(C_1-C_8)$alkyl diester of an unsaturated dicarboxylic acid, alternatively a mono$(C_1-C_8)$alkyl ester of an unsaturated dicarboxylic acid, alternatively a mono$(C_1-C_8)$alkyl ester of maleic acid. The (meth)acrylate means $H_2C=CHCO_2$— or $H_2C=C(CH_3)CO_2$—. The CTA may be acetone, methyl ethyl ketone, propionaldehyde, 2-propanol, ethyl acetate, isobutene, butane, 2-methylpropane, ISOPARTM-C, ISOPARTM-E, ISOPARTM-H, or a combination of any two or more thereof. The CTA, when present, may be from 0.03 to 10 wt % of the polymerization reaction mixture.

The (A) HSG-FP Copolymer may be characterized by a total hydrolyzable silyl group content of from 0.43 to 0.99 mol %. The total mol % of hydrolyzable silyl group content is calculated from wt % values of hydrolyzable silyl group content(s), wherein the wt % values are determined according to the X-Ray Fluorescence (XRF) Test Method, described later. For example, when the at least one alkenyl-functional hydrolyzable silane is vinyltrimethoxysilane (VTMS), its molecular weight is 148.23 g/mol, and at a comonomeric content is 2.0 wt %, the mol %=0.38 mol %. When VTMS comonomeric content is 5.0 wt %, the mol %=0.99 mol %. The mol % hydrolyzable silyl group content at any given wt % hydrolyzable silyl group content value will vary inversely with the molecular weight of the at least one alkenyl-functional hydrolyzable silane from which the hydrolyzable silyl groups are derived.

The (A) HSG-FP Copolymer contains hydrolyzable silyl groups. These groups independently may be a monovalent group of formula $(R^2)_m(R^3)_{3-m}Si$—, wherein subscript m is an integer of 1, 2, or 3; each $R^2$ is independently H, HO—, $(C_1-C_8)$alkoxy, $(C_2-C_6)$carboxy, phenoxy, $(C_1-C_6)$alkyl-phenoxy, $(C_1-C_6)$alkyl(H)N—, $((C_1-C_6)$alkyl$)_2$N—, $(C_1-C_6)$alkyl(H)C=NO—, or $((C_1-C_6)$alkyl$)_2$C=NO—; and each $R^3$ is independently $(C_1-C_8)$alkyl or phenyl. Each $R^2$ may be free of H and HO—, alternatively free of phenoxy and $(C_1-C_6)$alkyl-phenoxy. Each $R^2$ may be independently $(C_1-C_6)$alkoxy, $(C_2-C_6)$carboxy, $((C_1-C_6)$alkyl$)_2$N—, $(C_1-C_6)$alkyl(H)C=NO—, or $((C_1-C_6)$alkyl$)_2$C=NO—; alternatively $(C_1-C_6)$alkoxy; alternatively $(C_2-C_6)$carboxy; alternatively $((C_1-C_6)$alkyl$)_2$N—; alternatively $(C_1-C_6)$alkyl(H)C=NO—; alternatively $((C_1-C_6)$alkyl$)_2$C=NO—. All the hydrolyzable silyl groups of the (A) HSG-FP Copolymer may be the same. The hydrolyzable silyl groups are derived from the hydrolyzable silyl groups of the at least one alkenyl-functional hydrolyzable silane (comonomer) from which comonomeric units of the (A) HSG-FP Copolymer containing such groups are made.

Optional additive (B) silanol condensation catalyst. The (B) may be selected from any one of (i) to (iv): (i) a Brønsted acid; (ii) a Brønsted base; (iii) a Lewis acid; and (iv) a Lewis base. The (B) may be either (i) or (iii); alternatively either (ii) or (iv). The (B) may be the Lewis acid, which may be a dialkyltin dicarboxylate. The (B) may be the Brønsted acid, which may be a sulfonic acid of formula $RSO_3H$ wherein R is $(C_1-C_{10})$alkyl, $(C_6-C_{10})$aryl, a $(C_1-C_{10})$alkyl-substituted $(C_6-C_{10})$aryl, or a $(C_6-C_{10})$aryl-substituted $(C_1-C_{10})$alkyl; or a blocked sulfonic acid, which makes the sulfonic acid in situ.

Optional additive (C) antioxidant: an organic molecule that inhibits oxidation, or a collection of such molecules. The (C) antioxidant is different in composition than the (F) stabilizer, which means when the heterogeneous or homogeneous mixture contains both (C) and (F), the compound used as (C) is different than that used as (F). The (C) antioxidant functions to provide antioxidizing properties to the heterogeneous or homogeneous mixture and/or a cured polymer product made by curing the homogeneous mixture. Examples of suitable (C) are bis(4-(1-methyl-1-phenylethyl) phenyl)amine (e.g., NAUGARD 445); 2,2'-methylene-bis (4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl) methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800): stearyl 3-(3,5-di-t-butyl-4-hydroxyphenyl)propionate (e.g., IRGANOX 1076); 2,4-bis(dodecyl-thiomethyl)-6-methylphenol (IRGANOX 1726); 4,6-bis(octylthiomethyl)-o-cresol (e.g. IRGANOX 1520); and 2',3-bis [[3-[3,5-di-tert-butyl-4-hydroxyphenyl]propionyl]] propionohydrazide (IRGANOX 1024). The (C) may be 4,4"-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1, 3,5-triazine-2,4,6-trione and distearyl thiodipropionate. The heterogeneous and/or homogeneous mixture may be free of (C). When present, the (C) antioxidant may be from 0.01 to 1.5 wt %, alternatively 0.1 to 1.0 wt % of the total weight of the heterogeneous and/or homogeneous mixture.

Optional additive (D) a colorant. E.g., a pigment or dye. E.g., carbon black or titanium dioxide. The carbon black may be provided as a carbon black masterbatch that is a formulation of poly(1-butene-co-ethylene) copolymer (from ≥95 wt % to <100 wt % of the total weight of the masterbatch) and carbon black (from >0 wt % to ≤5 wt % of the total weight of the masterbatch. Carbon black is a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphite, and expanded graphite platelets). The heterogeneous and/or homogeneous mixture may be free of (D). When present (D) may be from 0.1 to 35 wt %, alternatively 1 to 10 wt % of the heterogeneous and/or homogeneous mixture.

Optional additive (E) scorch retardant. The (E) scorch retardant functions to inhibit premature moisture curing of the moisture-curable embodiments of the heterogeneous and/or homogeneous mixture, wherein premature moisture curing would result from premature or prolonged exposure of the mixture to ambient air or when the mixture is at ambient temperature or elevated temperature (e.g., during later melt extrusion). Examples of (E) are octyltriethoxysilane and octyltrimethoxysilane and vinyltrimethoxysilane. The heterogeneous and/or homogeneous mixture may be free of (E). When present (E) may be from 0.001 to 5.0 wt %, alternatively 0.01 to 3.0 wt %, alternatively 0.10 to 1.5 wt %, alternatively 0.15 to 1.0 wt % of the heterogeneous and/or homogeneous mixture.

Optional additive (F) a stabilizer for stabilizing the heterogeneous and/or homogeneous mixture against ultraviolet light (UV stabilizer). The (F) stabilizer is different in composition than the (C) antioxidant, which means when the mixture contains both (C) and (F), the compound used as (C) is different than that used as (F). Examples are a hindered amine light stabilizer (HALS), a benzophenone, or a benzotriazole. The (F) UV stabilizer may be a molecule that contains a basic nitrogen atom that is bonded to at least one sterically bulky organo group and functions as an inhibitor of degradation or decomposition, or a collection of such molecules. The HALS is a compound that has a sterically hindered amino functional group and inhibits oxidative degradation and can also increase the shelf lives of embodiments of the mixture that contain organic peroxide. Examples of suitable (F) are butanedioic acid dimethyl ester, polymer with 4-hydroxy-2,2,6,6-tetramethyl-1-piperidine-ethanol (CAS No. 65447-77-0, commercially LOWILITE 62); and N,N'-bisformyl-N,N'-bis(2,2,6,6-tetramethyl-4-piperidinyl)-hexamethylenediamine (CAS No. 124172-53-8, commercially Uvinul 4050 H). The heterogeneous and/or homogeneous mixture may be free of (F). When present, the (F) UV stabilizer may be from 0.001 to 1.5 wt %, alternatively 0.002 to 1.0 wt %, alternatively 0.05 to 0.1 wt % of the heterogeneous and/or homogeneous mixture.

Optional additive (G) processing aid: a molecule that decrease adherence of polymer melts in manufacturing equipment such as extruders and dies and to decrease melt fracture of materials in embodiments where the homogeneous mixture is used later therein. The (G) may be fluoropolymers, polyorganosiloxanes, metal salts of fatty carboxylic acids, fatty carboxamides, waxes, ethylene oxide (co)polymers, and non-ionic surfactants. The heterogeneous and/or homogeneous mixture may be free of (G). When present, the (G) processing aid may be from 0.05 to 5 wt % of the heterogeneous and/or homogeneous mixture.

Optional additive (H) flame retardant. The (H) flame retardant is a compound that inhibits or delays the spread of fire by suppressing chemical reactions in a flame. The (H) flame retardant may be (H1) a mineral, (H2) an organohalogen compound, (H3) an (organo)phosphorus compound; (H4) a halogenated silicone; (H5) a combination of any two or more of (H1) to (H4); (H6) a combination of any one of (H1) to (H4) and a flame-retardant synergist (e.g., antimony trioxide). The heterogeneous and/or homogeneous mixture may be free of (H). When present, the (H) flame retardant may be from 0.1 to 80.0 wt %, alternatively 1 to 50.0 wt %; and alternatively 5 to 30.0 wt % of the heterogeneous and/or homogeneous mixture.

The heterogeneous and/or homogeneous mixture may further comprise the (I) polymer that is not (A) or a styrenic polymer (which is not (A)). The (I) polymer that is not (A) may be a polyolefin-based macromolecule different in composition than the (A) polymer. The (I) polymer that is not (A) may be a polyolefin, a styrenic polymer, a rubber, a poly(vinyl chloride) polymer, a polyorganosiloxane such as a polydimethylsiloxane (PDMS), or a blend of any two or more thereof.

The manufactured article. The manufactured article made from the homogeneous mixture may comprise a shaped form thereof. Examples are a coating on a substrate, a tape, a film, a layer of a laminate, a foam, and a pipe.

The coated conductor. The manufactured article may be the coated conductor, comprising a conductive core and a polymeric layer at least partially surrounding the conductive core, wherein at least a portion of the polymeric layer comprises the homogeneous mixture, or a cured polymer product of curing same. The entire polymeric layer may comprise the cured polymer product. The conductive core may be linear shape (e.g., like a wire) having a length and proximal and distal ends spaced apart from each other by the length of the linear shape; and the polymeric layer may surround the conductive core except for the proximal and distal ends. The coated conductor may further comprise one or more additional polymeric layers, which independently may or may not comprise the cured polymer product; and/or an outer shielding layer (e.g., a metal sheath or sleeve). The coated conductor may comprise one or two insulation layers, at least one of which comprises the cured polymer product; alternatively or additionally one or two semiconductive layers, at least one of which comprises the cured polymer product containing a carbon black; alternatively or additionally an outer shielding layer, which comprises the cured polymer product.

The moisture-curable embodiments of the homogeneous mixture comprising (A) HSG-FP Copolymer may be moisture cured by exposure to ambient air or by immersion in hot water at 70° to 95° C. to make a cured polymer product. The extent of crosslinking of the cured polymer product may be characterized by measuring percent hot creep.

Substitution: any one, all but one, or each functional group may be unsubstituted.

Alternatively precedes a distinct embodiment. May confers a choice, not an imperative. Optional(ly): is absent (or excluded), alternatively is present (or included).

EXAMPLES

Melt Index ("$I_2$"): measured according to ASTM D1238-13, using conditions of 190° C./2.16 kg, formerly known as "Condition E". Units of grams per 10 minutes (g/10 min.).

Use XRF spectroscopy to determine weight percent (wt %) of silicon atom (Si) content of, and then calculate hydrolyzable silane comonomeric unit wt % in, test samples of the (A) HSG-FP Copolymer. Using a Buehler SimpliMet 300 automatic mounting press that is preheated for 3 minutes at 115.6° C. (240 degrees Fahrenheit (° F.)), press a powdered form of test sample for 1 minute under 8.3 megapascals (MPa; 1,200 pounds per square inch (psi)) to form a plaque having a thickness of about 6 mm, and cool the plaque to 25° C. Analyze the Si atom content of the plaque by wavelength dispersive XRF using a wavelength dispersive X-ray fluorescence spectrometer from PANalytical Axios. Determine Si atom content by comparing its line intensity in the XRF spectrum to a calibration curve for Si atom content that is established using polymer standards of known Si atom concentrations as independently measured using Neutron Activation Analysis (NAA) or Inductively Coupled Plasma (ICP) methods. Use the XRF measured Si atom wt % value, and the molecular weight(s) of the at least one alkenyl-functional hydrolyzable silane comonomer from which the hydrolyzable silyl groups were derived, to calculate hydrolyzable silyl group comonomeric unit wt % (i.e., wt % of the hydrolyzable silyl groups) in the (A) HSG-FP Copolymer. For hydrolyzable silyl groups derived from vinyltrimethoxysilane (VTMS), use the VTMS molecular weight of 148.23 g/mol. To calculate hydrolyzable silyl group content of (wt % of hydrolyzable silyl group comonomeric units in) the (A) HSG-FP Copolymer, use the XRF obtained Si atom wt % ("C") and the following formula: $p=C*(m/28.086)(1/10000 \text{ ppmw})$, wherein * means multiplication, / means division, p is wt % hydrolyzable silyl groups in (A), C is the Si atom amount (XFR) in weight parts per million (ppmw), m is the molecular weight in g/mol of the at least one alkenyl-functional hydrolyzable silane comonomer from which the hydrolysable silyl groups are derived, 28.086 is the atomic weight of a silicon atom, and 10000 ppmw is the number of weight parts per million in 1.00 wt %. For example, when XRF shows 379 ppmw of Si atom in (A) HSG-FP Copolymer and the comonomer used to make (A) is VTMS having a molecular weight of 148.23 g/mol, the wt % comonomeric content is 0.20 wt %. To calculate mol % of hydrolyzable silyl group comonomeric units in the (A) HSG-FP Copolymer of the at least one alkenyl-functional hydrolyzable silane comonomer used, use the calculated wt % of the hydrolyzable silyl group comonomeric units in (A) and the following equation: $G=100*(p/m)/[(p/m)+(100.00 \text{ wt \%}-p)/28.05 \text{ g/mol}]$, wherein * means multiplication, G is mole percent (mol %) of hydrolysable silyl groups in (A); p is wt % of hydrolysable silyl groups in (A), m is molecular weight in g/mol of the at least one alkenyl-functional hydrolyzable silane comonomer from which the hydrolysable silyl groups are derived, and 28.05 g/mol is the molecular weight of monomer ethylene ($H_2C=CH_2$). For example, when comonomeric content is 2.0 wt % and the comonomer is VTMS, p=2.0 wt % and m=148.23 g/mol, and G=0.38 mol %. When comonomeric content is 5.0 wt % and the comonomer is VTMS, p=5.0 wt % and m=148.23 g/mol, and G=0.99 mol %. When two or more alkenyl-functional hydrolyzable silane comonomers having different molecular weights are used to make (A), the molecular weight used in the calculation of the total mol % of all hydrolyzable silyl groups in (A) is a weighted average molecular weight of the comonomers. The weighting may be determined by the proportion of the amounts of the comonomers fed into the GPP reactor; alternatively by NMR spectroscopy on the (A) HSG-FP Copolymer to determine the relative amounts of the different comonomeric units in the (A) HSG-FP Copolymer when the respective hydrolyzable silyl groups are bonded to different types of carbon atoms (e.g., tertiary versus secondary carbon atoms); alternatively by Fourier Transform Infrared (FT-IR) spectroscopy calibrated to provide quantitation of the different types comonomers.

Tape Preparation Method: Used to prepare the moisture-curable polyethylene formulation in the form of a tape for ambient curing and hot creep testing evaluations. Feed the formulations prepared according to the above method into a Brabender 1.905 cm (¾ inch) extruder equipped with a 25:1 double mixing zone (pineapple) screw, a 40/60/40 mesh screen pack, and a 5.08 cm (2 inches) width head die. The extruder has a temperature profile across four zones of 150° C., 160° C., 170° C., and 170° C. at the head die and a screw speed of 60 rotations per minute (rpm). This makes different ones of formulation in the form of a tape having an average thickness of from 1.37 to 1.70 mm (54 to 67 mils).

Ambient Moisture Curing Method. For characterization and comparison, the ambient curing conditions were controlled as follows. Cure the tape specimens made by the Tape Preparation Method in a 23° C.±2° C. and 50%±2% RH environment for up to 182 days as indicated in Tables 3 to 5 later to make cured polymer products. Measure hot creep of the cured polymer products according to the Hot Creep Test Method.

Hot Water Curing Method. Immerse the tape specimens made by the Tape Preparation Method for 20 hours in a 90° C.±2° C. water bath as indicated in Tables 3 to 5 later to make cured polymer products. Measure hot creep of the cured polymer products according to the Hot Creep Test Method.

Hot Creep Test Method. Measures extent of crosslinking, and thus extent of curing, in test samples of the cured polymer products prepared by the Moisture Curing Method. Subject test samples to Hot Creep Test Method under a load, Wt, and at 200° C., according to UL 2556, Wire and Cable Test Methods, Section 7.9. Load Wt=CA*200 kilopascals (kPa, 29.0 pound-feet per square inch), wherein CA is the cross-sectional area of a dog bone sample cut from a pressed plaque prepared according to the Plaque Preparation Method. Prepare three dog bone specimens per test material. Make two marks on the specimen at an original distance G apart from each other, wherein G=25+/−2 mm. Place in upper grip of hot creep test assembly. Hang load 0.2 megapascals (MPa) from gripped specimen. Heat the test assembly with dog bone specimen in a preheated circulating air oven at 200° C.+/−2° C. for 15 minutes, and then with the load still attached measure the specimen's final length $D_e$ between the marks. Calculate hot creep elongation percent (HCE) according to equation 1: $HCE=[100*(D_e-G)]/G$ (1). The amount of extension divided by initial length provides a measure of hot creep as a percentage. The lower the hot creep percent, the lower the extent of elongation of a test sample under load, and thus the greater the extent of crosslinking, and thus the greater the extent of curing. A lower hot creep value suggests a higher crosslink degree. The hot creep measurement of samples cured immersed in a 90° C.±2° C. water bath for 20 hours indicates an ultimate extent of crosslinking in the cured product. The greater the ultimate extent of crosslinking in the cured polymer product, the greater the amounts of non-crosslinkable polymer or non-moisture curable (e.g., peroxide and/or light curable only) polymer (e.g., other than HSG-FP Copolymer (e.g., polyethylene) that may be incorporated into the moisture-curable polyethylene formulation while the cured polymer product still achieves satisfactory hot creep performance of less than or equal to 175% after curing.

Wire Coating Preparation Method: Used a BRABENDER ¾ inch (1.91 cm) extruder with variable speed drive, a 25:1 Maddock mixing head screw, a BRABENDER cross-head wire die, lab water cooling trough with air wipe, a laser micrometer and a variable speed wire puller, temperature profile of 150° C. (zone 1), 170° C. (zone 2), 190° C. (zone 3), and 195° C. (head/die) and a 40/40 mesh screen pack. Extruded melt at 40 rotations per minute (rpm) screw speed and approximately 2.4 meter (m) (8 feet) per minute take-up speed depositing a coating of the melt mixture onto 14 AWG solid copper wire (1.628 mm diameter; AMG is American Wire Gauge). The coating had a nominal 0.8 mm wall thickness.

Coated Wire Curing Method: Cured wire samples, prepared according to the Wire Coating Preparation Method, by immersing them in a water bath maintained at 95° C. for different lengths of time, as reported later, to give cured insulated wire samples. Stripped a portion of the cured coating ("insulation") therefrom by slightly drawing down the copper to make the insulation easy to remove, and measured hot creep performance thereof. Tested the insulation samples without the conductor for hot creep in an oven set at 200° C. under a stress of 0.2 MPa on the bottom of the sample to allow the sample to elongate for 15 minutes. Report result as the average elongation of three samples expressed as a percentage. See the Hot Creep Test Method for details.

Moving Die Rheometer (MDR) Test Method (MDR: ML at 182° C. (N-m), MDR: MH−ML at 182° C. (N-m)): ASTM D5289-12, *Standard Test Method for Rubber Property—Vulcanization Using Rotorless Cure Meters*. Measure torque of a 6 grams cold pressed test sample using the following procedure. Heated test sample, which was obtained directly from a Brabender mixing bowl, in a moving die rheometer (MDR) instrument MDR2000 (Alpha Technologies), at 182° C. for 20 minutes at 0.5 degrees arc oscillation, while monitoring change in torque. Designate the lowest measured torque value as "ML", expressed in deciNewton-meter (dN-m). As curing or crosslinking progresses, the measured torque value increases, eventually reaching a maximum torque value. Designate the maximum or highest measured torque value as "MH", expressed in dN-m. All other things being equal, the greater the MH torque value, the greater the extent of crosslinking. All other things being equal, the greater the MH−ML torque value difference, the greater the amount of crosslinking. Measured in pound-inches (lb.-in.), and converted to Newton-meter (N-m), wherein 1.00 lb.-in.=0.113 N-m.

Polyolefin solids 1: a linear low-density polyethylene (LLDPE) having a density of 0.92 g/cm$^3$ a melt index (I$_2$) of 0.65 g/10 min. Used in the form of pellets.

Polyolefin solids 2: a reactor HSG-FP Copolymer made by copolymerizing ethylene and vinyltrimethoxysilane (VTMS) at high pressure and temperature in the presence of an organic peroxide catalyst and in absence of a metal-based catalyst. The HSG-FP Copolymer had a trimethoxysilylethyl group content of 1.5 wt %, a density of 0.92 g/cm$^3$, and a melt index (I$_2$) of 1.5 g/10 min. Used in the form of dry pellets.

Polyolefin solids 3: a reactor HSG-FP Copolymer made by copolymerizing ethylene and 3-methacryloxypropyltrimethoxysilane (M3M) at high pressure and temperature in the presence of an organic peroxide catalyst and in absence of a metal-based catalyst. Polyolefin Solids 3 have a melt index (I$_2$) of 0.9 g/10 min. and a 0.9 wt % content of M3M. Used in the form of dry pellets.

Liquid Additive 1: vinyltrimethoxysilane (VTMS), an alkenyl-functional hydrolyzable silane comonomer, delivered as a neat liquid.

Liquid Additive 2: dicumyl peroxide (DCP), an organic peroxide, delivered as a neat liquid.

Liquid Additive 3: dibutyltin dilaurate (DBTDL), a moisture cure catalyst, delivered as a neat liquid.

Liquid Additive 4: octyltriethoxysilane (OTES), a scorch retardant, delivered as a neat liquid. Available as PROSIL 9202.

Particulate Solid Additive 1: a natural (free of colorant) catalyst masterbatch comprising 85 wt % of a linear low-density polyethylene (LLDPE) having a density of 0.92 g/cm$^3$ and a melt index (I$_2$) of 0.65 g/10 min., 9 wt % of a low-density polyethylene (LDPE) having a density of 0.92 g/cm$^3$ and a melt index (I$_2$) of 2 g/10 min., 3.4 wt % of solid antioxidant pentaerythritol tetrakis(3-(3,5-bis(1,1-dimethylethyl)-4-hydroxyphenyl)propionate, and 2.6 wt % of dibutyltin dilaurate. (Dried overnight under vacuum at 60° C. before use.)

Particulate Solid Additive 2: alumina trihydrate (ATH), an in-situ moisture-generating agent, delivered as a neat solid.

Comparative Example 1 (CE1): making a homogeneous mixture by melt-mixing constituents thereof (Polyolefin Solids 1 and Liquid Additives 1 and 2 and Particulate Solid Additive 1 in an extruder. Preheated Polyolefin Solids 1 at 70° C. for one hour in a glass jar. Added Liquid Additives 1 and 2. Tumble mixed for 10 minutes. Left the glass jar with mixture in the oven overnight at room temperature for 16 to 20 hours to complete soaking of Liquid Additives 1 and 2 into the Polyolefin Solids 1. Physically blended the resulting Liquid Additives 1 and 2-soaked Polyolefin Solids 1 with of the Particulate Solid Additive 1 to give a heterogeneous mixture. Melted the Polyolefin Solids 1 and Particulate Solid Additive 1 of the heterogeneous mixture, and mixed the heterogeneous mixture melt in a BRABENDER ¾ inch (1.91 cm) extruder with variable speed drive, a 25:1 Maddock mixing head screw, a BRABENDER cross-head wire die, lab water cooling trough with air wipe, a laser micrometer and a variable speed wire puller, temperature profile of 150° C. (zone 1), 170° C. (zone 2), 190° C. (zone 3), and 195° C. (head/die) and a 40/40 mesh screen pack to give a melt-mixed homogeneous mixture of a melt of Polyolefin Solids 1, a melt of Particulate Solid Additive 1, and the Liquid Additives 1 to 3.

Comparative Example 1A (CE1A). Extruded the melt-mixed homogeneous mixture of CE1 as a coating onto a 14 AWG solid copper wire to mimic manufacturing of coated conductor, and measure hot creep performance of the coating. Using the same extruder and extruder conditions as in CE1, extruded the melt-mixed homogeneous mixture as a coating onto wire according to the Wire Coating Preparation Method described above. Cured the coating to give an insulated wire of CE1A, and stripped a portion of the insulation therefrom, and measured hot creep performance thereof according to the Coated Wire Curing Method.

Inventive Example 1 (IE1): making a homogeneous mixture by acoustic mixing constituents thereof (Polyolefin Solids 1 and Liquid Additives 1 and 2 and Particulate Solid Additive 1) in an acoustic mixer. Added 150 grams (g) of Polyolefin Solids 1, 2.41 g Liquid Additive 1, and 0.16 g Liquid Additive 2 to a glass jar, and acoustic mixed the jar's contents using a RESODYN Acoustic Mixer (LabRAM Mixer) at 23° to 26° C. for 2 minutes to make a first homogeneous mixture. Then added 8 g of the Particulate Solid Additive 1 to form a second heterogeneous mixture. Acoustic mixed the second heterogeneous mixture for 0.5 minutes to give a second homogeneous mixture.

Inventive Example 1A (IE1A): Extruded the acoustic-mixed second homogeneous mixture of IE1 as a coating onto a 14 AWG solid copper wire to mimic manufacturing of coated conductor, and measure hot creep performance of the coating. Added the second homogeneous mixture of IE1 into the BRABENDER ¾ inch (1.91 cm) extruder, melted the Polyolefin Solids 1 and the Particulate Solid Additive 1 to give the second homogeneous mixture as a melt. Using the same extruder and extruder conditions as in CE1, extruded the melt as a coating onto wire according to the Wire Coating Preparation Method described above. Cured the coating to give an insulated wire of IE1A, and stripped a portion of the insulation therefrom, and measured hot creep performance thereof according to the Coated Wire Curing Method.

TABLE 1

Compositions of Comparative Example 1 and Inventive Example 1 and Hot Creep performance of Comparative Example 1 and Inventive Example 1 A.

| Ex. No. | CE1 | IE1 | CE1A | IE1A |
|---|---|---|---|---|
| Polyolefin Solids 1 (LLDPE polymer), (wt %) | 93.4 | 93.4 | 93.4 | 93.4 |
| Liquid Additive 1 (VTMS) (wt %) | 1.5 | 1.5 | 1.5 | 1.5 |
| Liquid Additive 2 (DCP) (wt %) | 0.1 | 0.1 | 0.1 | 0.1 |
| Particulate Solid Additive 1 (wt %) | 5 | 5 | 5 | 5 |
| Total | 100 | 100 | 100 | 100 |
| Hot Creep (200° C., 0.2 MPa) Cure Performance: (% elongation, after curing for 0.5 hour) | N/a | N/a | 68.4 | 67.1 |
| Hot Creep (200° C., 0.2 MPa) Cure Performance: (% elongation, after curing for 1 hour) | N/a | N/a | 39.1 | 37.2 |
| Hot Creep (200° C., 0.2 MPa) Cure Performance: (% elongation, after curing for 2 hours) | N/a | N/a | 30.5 | 29.4 |
| Hot Creep (200° C., 0.2 MPa) Cure Performance: (% elongation, after curing for 6 hours) | N/a | N/a | 16.2 | 17.4 |
| Unaged mechanical property: tensile strength (MPa) | N/a | N/a | 14.7 | 15.7 |
| Unaged mechanical property: elongation (%) | N/a | N/a | 243 | 259 |
| Aged (135° C., 7 days) mechanical property: tensile strength (MPa) | N/a | N/a | 13.7 | 13.9 |
| Aged (135° C., 7 days) mechanical property: elongation (%) | N/a | N/a | 207 | 214 |

In Table 1, hot creep measurements made after curing the mixtures of CE1 and IE1 to give insulated wires of CE1A and IE1A surprising show that percent elongation of cured samples prepared by curing the inventive acoustic mixed homogeneous mixture for 0.5, 1, or 2 hours are beneficially lower than percent elongation of cured samples prepared by curing the comparative melt-mixed homogeneous mixture for 0.5, 1, or 2 hours. That is, a greater extent of curing (crosslinking) is advantageously achieved earlier with the inventive mixture. The percent elongation of cured sample prepared by curing the inventive acoustic mixed homogeneous mixture for 6 hours, however, was higher than percent elongation of cured samples prepared by curing the comparative melt-mixed homogeneous mixture for 6 hours. A main value of invention is easier mixing, which is demonstrated by the foregoing.

Also, both unaged and aged tensile strength was higher for the inventive acoustic mixed homogeneous mixture IE1 than for the melt-mixed homogeneous mixture CE1.

Comparative Example 2 (CE2): making a homogeneous mixture by melt-mixing constituents thereof (Polyolefin Solids 2 and Liquid Additive 4) by soaking. Preheated Polyolefin Solids 2 at 70° C. for 30 minutes in a glass jar. Added Liquid Additive 4. Tumble mixed for 10 minutes. Left the glass jar with mixture in the oven overnight at room temperature for 16 to 20 hours to complete soaking of Liquid Additive 4 into the Polyolefin Solids 2.

Inventive Example 2 (IE2): making a homogeneous mixture by acoustic mixing Polyolefin Solids 2, Liquid Additive 3, and Particulate Solid Additive 2 in an acoustic mixer. Added 160 g of Polyolefin Solids 2 and Liquid Additive 3 into a glass jar to make a first heterogeneous mixture comprising Polyolefin Solids 2 and Liquid Additive 3; and acoustic mixed the jar's contents using a RESODYN Acoustic Mixer (LabRAM Mixer) at 23° to 26° C. for 2 minutes to make a first homogeneous mixture comprising Polyolefin Solids 2 and Liquid Additive 3. Then added Particulate Solid Additive 2 to the first homogeneous mixture to give a second heterogeneous mixture comprising Polyolefin Solids 2, Particulate Solid Additive 2, and the Liquid Additive 3. Acoustic mixed the second heterogeneous mixture using the RESODYN Acoustic Mixer (LabRAM Mixer) at 23° to 26° C. for 2 minutes to make a second homogeneous mixture comprising Polyolefin Solids 2, Particulate Solid Additive 2, and the Liquid Additive 3.

Inventive Example 3 (IE3): making a homogeneous mixture by acoustic mixing Polyolefin Solids 2, Liquid Additives 3 and 4, and Particulate Solid Additive 2 in an acoustic mixer. Added 160 g of Polyolefin Solids 2 and Liquid Additive 4 into a glass jar to make a first heterogeneous mixture comprising Polyolefin Solids 2 and Liquid Additive 4; and acoustic mixed the jar's contents using a RESODYN Acoustic Mixer (LabRAM Mixer) at 23° to 26° C. for 2 minutes to make a first homogeneous mixture comprising Polyolefin Solids 2 and Liquid Additive 4. Then added Particulate Solid Additive 2 and Liquid Additive 3 to the first homogeneous mixture to give a second heterogeneous mixture comprising Polyolefin Solids 2, Particulate Solid Additive 2, and the Liquid Additives 3 and 4. Acoustic mixed the second heterogeneous mixture using the RESODYN Acoustic Mixer (LabRAM Mixer) at 23° to 26° C. for 2 minutes to make a second homogeneous mixture comprising Polyolefin Solids 2, Particulate Solid Additive 2, and the Liquid Additives 3 and 4.

Inventive Example 4 (IE4): making a homogeneous mixture by acoustic mixing Polyolefin Solids 3, Liquid Additive 3, and Particulate Solid Additive 2 in an acoustic mixer. Replicate the procedure of IE2 except replace Polyolefin Solids 2 with an equal weight of Polyolefin Solids 3 to make a first homogeneous mixture comprising Polyolefin Solids 3 and Liquid Additive 3; a second heterogeneous mixture comprising Polyolefin Solids 3, Particulate Solid Additive 2, and the Liquid Additive 3; and a second homogeneous mixture comprising Polyolefin Solids 3, Particulate Solid Additive 2, and the Liquid Additive 3.

Inventive Example 5 (IE5): To the resulting Liquid Additive 4-soaked Polyolefin Solids 2 of CE2 added Particulate Solid Additive 2 and Liquid Additive 3 to give a heterogeneous mixture. Acoustic mixed the heterogeneous mixture using the RESODYN Acoustic Mixer (LabRAM Mixer) at 23° to 26° C. for 2 minutes to make a first homogeneous mixture of Polyolefin Solids 2. Particulate Solid Additive 2, and the Liquid Additives 3 and 4.

TABLE 2

Compositions of Comparative Example 2 and Inventive Examples 2 to 5, visual observations, and moving die rheometer (MDR) performance.

| Ex. No. | CE2 | IE2 | IE3 | IE4 | IE5 |
|---|---|---|---|---|---|
| Polyolefin Solids 2 (ethylene/VTMS copolymer) (wt %) | 96.8 | 97.8 | 96.8 | 0 | 96.8 |
| Polyolefin Solids 3 (ethylene/M3M copolymer) (wt %) | 0 | 0 | 0 | 97.8 | 0 |
| Liquid Additive 3 (DBTDL) (wt %) | 0.2 | 0.2 | 0.2 | 0.2 | 0.2 |
| Liquid Additive 4 (OTES) (wt %) | 1 | 0 | 1 | 0 | 1 |
| Particulate Solid Additive 2 (ATH) (wt %) | 2 | 2 | 2 | 2 | 2 |
| Total | 100 | 100 | 100 | 100 | 100 |
| Visual Observation of second homogeneous mixture: well dispersed Particulate Solid Additive 2? | Yes | Yes | Yes | Yes | Yes |
| Visual Observation of second homogeneous mixture: dry solids? | Yes | Yes | Yes | Yes | Yes |
| Moving Die Rheometer (MDR; 200° C., 30 min.) | See below | See below | See below | See below | See below |
| ML | 0.21 | 0.32 | 0.24 | 0.33 | 0.21 |
| MH | 0.6 | 1.68 | 0.63 | 1.11 | 0.6 |
| MH − ML | 0.4 | 1.36 | 0.39 | 0.78 | 0.4 |

In Table 2, the homogeneous compositions of CE2, IE3, and IE5 contained a scorch retardant (OTES), whereas homogeneous compositions IE2 and IE4 did not contain a scorch retardant (OTES). In Table 2, the effectiveness of acoustic mixing in making homogeneous compositions in IE2 to IE5 is similar to the soaking method of CE2, but the acoustic mixing method achieves homogeneity in substantially less time and at a substantially lower temperature. Also, the acoustic mixing method was also effective in making homogeneous mixtures in a dry pellet or powder form.

Inventive Examples 6 to 11 (IE6 to IE11): making a homogeneous mixture by acoustic mixing Polyolefin Solids 1, Liquid Additives 2 and 3, Particulate Solid Additive 2, and, optionally, Liquid Additive 1, in an acoustic mixer. Added 160 g of Polyolefin Solids 1 and Liquid Additives 2 and 3, Particulate Solid Additive 2, and, optionally, Liquid Additive 1, into a glass jar to make a heterogeneous mixture comprising Polyolefin Solids 1, Liquid Additives 2 and 3, Particulate Solid Additive 2, and, optionally, Liquid Additive 1; and acoustic mixed the jar's contents using a RESODYN Acoustic Mixer (LabRAM Mixer) at 23° to 26° C. for 1 minute to make a homogeneous mixture comprising Polyolefin Solids 1, Liquid Additives 2 and 3, Particulate Solid Additive 2, and, optionally, Liquid Additive 1.

TABLE 3

Compositions of Inventive Examples 6 to 11, visual observations, and moving die rheometer (MDR) performance.

| Ex. No. | IE6 | IE7 | IE8 | IE9 | IE10 | IE11 |
|---|---|---|---|---|---|---|
| Polyolefin Solids 1 (LLDPE polymer) (wt %) | 97.75 | 97.7 | 97.6 | 96.25 | 96.2 | 96.1 |
| Liquid Additive 1 (VTMS) (wt %) | 0 | 0 | 0 | 1.5 | 1.5 | 1.5 |
| Liquid Additive 2 (DCP) (wt %) | 0.05 | 0.1 | 0.2 | 0.05 | 0.1 | 0.2 |
| Liquid Additive 3 (DBTDL) (wt %) | 0.2 | 0.2 | 0.2 | 0.2 | 0.2 | 0.2 |
| Particulate Solid Additive 2 (ATH) (wt %) | 2 | 2 | 2 | 2 | 2 | 2 |
| Total | 100 | 100 | 100 | 100 | 100 | 100 |
| Visual Observation of second homogeneous mixture: well dispersed Particulate Solid Additive 2? | Yes | Yes | Yes | Yes | Yes | Yes |
| Visual Observation of second homogeneous mixture: dry solids? | Yes | Yes | Yes | Yes | Yes | Yes |
| Moving Die Rheometer (MDR; 160° C., 60 min., followed by 200° C., 30 min.) | See below | See below | See below | See below | See below | See Below |
| ML | 0.86 | 1.18 | 1.2 | 0.67 | 0.92 | 2.27 |
| MH | 0.95 | 1.35 | 1.38 | 0.88 | 1.48 | 3.11 |
| MH − ML | 0.09 | 0.17 | 0.2 | 0.21 | 0.56 | 0.84 |

In Table 3 results of testing the homogeneous mixtures of IE6 to IE11 in an MDR at 160° C. for 60 minutes, followed by another 30 minutes at 200° C. are shown. Computed the total increase in MDR torque ("delta torque") over the entire 90 minutes period, which computed values served as indicators of extent of crosslinking due to thermal decomposition of peroxide (leading to peroxide crosslinking through carbon-carbon coupling) and/or decomposition of Particulate Solid Additive 2 (ATH), leading to in situ water generation and thus silane crosslinking through hydrolysis and condensation reactions when Liquid Additive 1 (VTMS) had been grafted to the polyethylene. At 0.05 wt % loading of Liquid Additive 2 (DCP), there was little or no difference in delta torque with and without Liquid Additive 1 (VTMS). As the amount of Liquid Additive 2 (DCP) was increased up to 0.2 wt %, however, it was observed that the homogeneous mixtures containing Liquid Additive 1 (VTMS) exhibited progressively greater values of delta torque, compared with the corresponding formulations that did not contain Liquid Additive 1 (VTMS). Without being bound by theory, it is believed that the delta torque values observed without Liquid Additive 1 (VTMS) is attributed solely to peroxide (Liquid Additive 2 (DCP))-facilitated carbon-carbon bond formation/crosslinking, whereas the delta torque values observed in the presence of Liquid Additive 1 (VTMS) are believed to be due to a combination of peroxide (Liquid Additive 2 (DCP))-facilitated carbon-carbon crosslinking and moisture facilitated silane crosslinking. At any given peroxide (Liquid Additive 2 (DCP)) loading, the difference between line plots of delta torque versus MDR time period lines reflects the additional contribution of silane crosslinking over just peroxide crosslinking. These data suggest that Liquid Additive 1 (VTMS) grafting efficiency increased with increasing amounts of Liquid Additive 2 (DCP) in the homogeneous mixtures. After these MDR evaluations, the resulting materials ranged from thermoplastic (at the low delta torque values) to thermoset (at the higher values of delta torque).

The invention claimed is:

1. A method of making a homogeneous mixture of polyolefin solids and a liquid additive without melting the polyolefin solids during the making, the method comprising applying acoustic energy at a frequency of from 20 to 100 hertz (Hz) to a first heterogeneous mixture comprising at least one liquid additive and polyolefin solids for a period of time and at an acoustic intensity effective to substantially intermix the at least one liquid additive and the polyolefin solids together while maintaining temperature of the first heterogeneous mixture above the freezing point of the at least one liquid additive and below the melting temperature of the polyolefin solids, thereby making a first homogeneous mixture comprising the polyolefin solids and the at least one liquid additive without melting the polyolefin solids.

2. The method of claim 1 wherein the applying step is characterized by any one of features (i) to (v): (i) the frequency is from 50 to 70 Hz; (ii) the period of time is from 0.5 minute to 4 hours; (iii) both (i) and (ii); (iv) the maintaining temperature of the first heterogeneous mixture below the melting temperature of the polyolefin solids comprises maintaining temperature of the first heterogeneous mixture at from 10° to 109° C.; and (v) both (iv) and any one of (i) to (iii).

3. The method of claim 1 wherein the polyolefin solids of the first heterogeneous mixture are characterized by a physical form that is a powder, granules, or pellets and by a melting temperature that is from 61° to 180° C.; and the at least one liquid additive of the first heterogeneous mixture is characterized by a freezing point of less than 20° C. or by a melting point from 20° to 99° C.; and the first heterogeneous mixture is maintained at a temperature greater than the freezing point or melting point of the at least one liquid additive and less than 110° C. during the applying step.

4. The method of any one of claim 1 wherein the polyolefin of the polyolefin solids is: a polyethylene homopolymer; an ethylene/alpha-olefin copolymer; a (hydrolyzable silyl group)-functional polyethylene copolymer (HSG-FP Copolymer); an ethylene/unsaturated carboxylic ester copolymer; or a blend of any two or more thereof.

5. The method of claim 1, wherein the at least one liquid additive is any one or more of additives $(B)_{liq}$ to $(I)_{liq}$: $(B)_{liq}$ a liquid silanol condensation catalyst; $(C)_{liq}$ a liquid antioxidant; $(D)_{liq}$ a liquid colorant; $(E)_{liq}$ a liquid scorch retardant; $(F)_{liq}$ a liquid stabilizer for stabilizing the homogeneous mixture against effects of ultraviolet light (UV stabilizer); $(G)_{liq}$ a liquid processing aid; $(H)_{liq}$ a liquid flame retardant; and $(I)_{liq}$ a liquid polymer.

6. The method of claim 1 wherein the first heterogeneous mixture further comprises at least one particulate solid additive that is different than the polyolefin solids and the first homogeneous mixture further comprises the at least one particulate solid additive.

7. The method of any one of claim 1 further comprising, before the applying step, making the first heterogeneous mixture by contacting step (i) or (ii): (i) contacting the polyolefin solids with the at least one liquid additive to make the first heterogeneous mixture; or (ii) contacting the polyolefin solids with a lower-melting solid additive having a melting point from 25° to 110° C. to make a heterogeneous solids pre-mixture, and melting the lower-melting solid additive without melting the polyolefin solids so as to make the first heterogeneous mixture.

8. The method of claim 1 further comprising a step of contacting the first homogeneous mixture with at least one particulate solid additive that is different than the polyolefin solids to make a second heterogeneous mixture comprising the first homogeneous mixture and the at least one particulate solid additive; and then applying acoustic energy at a frequency of from 20 to 100 Hz and at an acoustic intensity effective to substantially intermix the same together while maintaining temperature of the second heterogeneous mixture above the freezing point of the at least one liquid additive and below the melting temperature of the polyolefin solids, thereby making a second homogeneous mixture comprising the polyolefin solids, the at least one liquid additive, and the at least one particulate solid additive, without melting the polyolefin polymer solids during the making steps.

9. The method of claim 1 further comprising a step of melting the polyolefin solids of the homogeneous mixture to make a melt mixture; shaping the melt mixture to give a shaped melt mixture; and cooling the shaped melt mixture to give a shaped solid.

10. The method of claim 9 wherein the shaping step comprises extruding the melt mixture as a coating onto a conductive core, and allowing the coating to solidify to make a coated conductor comprising the conductive core and a coating-shaped solid at least partially covering the conductive core.

11. The method of claim 9 further comprising curing the polyolefin of the shaped solid to give a shaped cured product.

12. The shaped cured product prepared by the method of claim 11.

* * * * *